No. 11,747. Reissued June 13, 1899.

E. P. BODEN.

TREE OR VINE PULLER.

(Application filed Dec. 28, 1898.)

Witnesses
T. L. Moorshead
Geo. M. Copenhaver.

Inventor
Edmund P. Boden
by Dewey, Strong & Co
his Attorneys

THE NORRIS PETERS CO., PHOTO-LITHO., WASHINGTON, D. C.

UNITED STATES PATENT OFFICE.

EDMUND P. BODEN, OF SANTA CLARA, CALIFORNIA.

TREE OR VINE PULLER.

SPECIFICATION forming part of Reissued Letters Patent No. 11,747, dated June 13, 1899.

Original No. 599,217, dated February 15, 1898. Application for reissue filed December 28, 1898. Serial No. 700,572.

*To all whom it may concern:*

Be it known that I, EDMUND P. BODEN, a citizen of the United States, residing at Santa Clara, county of Santa Clara, State of California, have invented an Improvement in Tree or Vine Pullers; and I hereby declare the following to be a full, clear, and exact description of the same.

My invention relates to an apparatus which is especially designed to pull small trees, vines, bushes, &c., from the ground.

It consists in the parts and the constructions and combinations of parts, which I shall hereinafter describe and claim.

Figure 1:
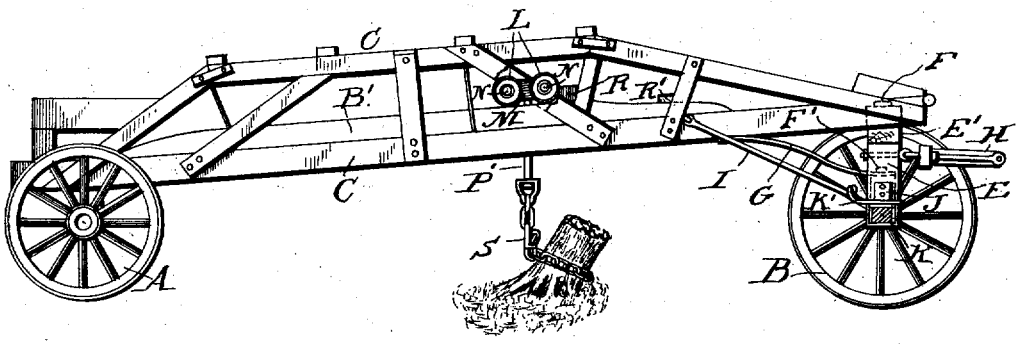
Figure 2:
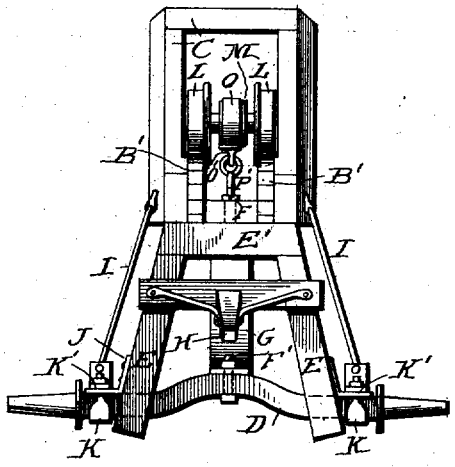
Figure 3:
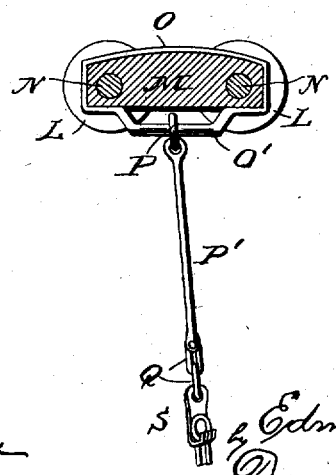

Figure 1 is a side view of my apparatus. Fig. 2 is a rear view of the same. Fig. 3 is a sectional view of the trunk and connections.

The object of this invention is to provide a simple inexpensive apparatus with a powerful leverage by which stumps of all small trees—such as fruit-trees, vines, and bushes—which have been cut down may be removed with ease and rapidity. The result is accomplished by means of a truck with a chain or means by which it may be connected with the stump or vine to be pulled and a vehicle having a track or runway upon which the truck is fitted to travel when the vehicle is moved along with relation to the truck, the latter being prevented from advancing with the vehicle by its connection with the stump.

A are the front and B the rear wheels of my apparatus, having a truss or other stout framework or runway C, extending from one axle to the other and adapted to carry the wheels of a truck M, and by means of a chain or other connection P′ the truck is secured to the stump and anchored so that the vehicle may be moved lengthwise beneath the stationary truck and through interposed mechanism. A tension is brought upon the chain which will operate to raise the stump. A very suitable device is the inclined plane, which is here illustrated. As thus constructed the front and rear wheels are separated to a considerable distance, and the frame C extends between them and is sufficiently strengthened by truss-braces or in other suitable manner.

As shown, the rear axle carries timbers E E′, which support that end of the track at a higher elevation than the front end. The timbers E are connected with the rear axle by angle-plates J and clips and clip-plates K K′ or by other equivalent means.

The truck is composed of a block M with axles N and wheels L, which are adapted to travel upon the track B′. A strap O surrounds the body M, forming an open space below, and a bar O′, which is fitted with a traveler P, and a link P′ and chain Q serve to connect it with the stump, vine, or brush to be pulled.

Any suitable power may be applied to move the vehicle after the connection has been made between the stump and the truck, and as the truck is held stationary by being anchored to the stump the movement of the vehicle with relation to it will apply the power to raise the stump.

The rear end of the frame B is connected with the top bar E′, and a king bolt (or bolts) F F′ forms a swivel and allows the rear-wheel axle to be turned to assist in steering the machine when required, the turning being effected by a pole or lever H.

A central brace G insures a rigid connection between the axle and the track-frame, and detachable side rods I serve to fix the axle with relation to the frame when desired.

The operation of the machine will then be as follows: The truck M is first brought to the front portion of the machine and upon the lowest portion of the inclined track B′. A chain is then fixed about the stump to be pulled by means of a claw-hook S, and the wagon is moved ahead. The first action will be to cause the truck M to move up the sharp incline at the front end of the track until the slack of the chain is taken up. As the wagon continues to move forward the truck moves up the track B′, and the tension thus caused will pull the stump out of the ground or loosen it very materially. When the truck reaches a point near the rear end of the track B′, it will come in contact with a stop R, which is fixed across the framework C, and if the stump is sufficiently loosened the slight pull caused by the further travel of the machine will drag the stump from the ground. If at this point a considerable strain is brought upon the chain, the traveler P will slide to the rear end of the guide O′, thus transferring the pull to the rear part of the truck, and this prevents the latter from being tilted up when it strikes the stop R. This stop may be fixed at any point upon the track and moved to increase or decrease the travel of the pulling device, or a second stop R′ may serve after the first one has been removed.

Having thus described my invention, what I claim as new, and desire to secure by Letters Patent, is—

1. A device for pulling stumps consisting of a frame mounted upon a vehicle adapted to be moved over the ground, a track supported by said frame in the line of movement of the vehicle, a truck movable upon said track and means for connecting the truck with the stump, and applying a lifting tension thereto when the vehicle is advanced in its line of movement beneath the truck.

2. A device for extracting stumps consisting of a longitudinally-movable vehicle, an inclined plane rising from front toward the rear wheels upon said vehicle, a track supported by said inclined plane in the line of movement of the vehicle, a wheeled truck adapted to travel upon said track, and a connecting device between the truck and the stump whereby the connection may be made when the truck is at its lowest point and the stump extracted by the forward longitudinal movement of the vehicle beneath the truck.

3. A device for pulling stumps consisting of axles and bearing-wheels, a track and supporting-framework extending between and supported by said axles, a framework mounted upon the rear axle and forming a support for the rear end of the intermediate framework and track whereby the latter stands at an inclination from the front to the rear end, a brace-rod connecting the axle forwardly with the inclined framework, king-bolts connecting the frames and rear axle in line, whereby the rear axle is turnable about the pivotal line, and brace-rods adapted to connect the axle and the framework when it is desired to retain the axle rigidly in place.

4. In an apparatus of the character described, a wheeled vehicle, an inclined framework and track rising from the front toward the rear, a truck or traveler movable thereon, a chain and connection between the truck and the stump to be pulled, whereby the latter is gradually lifted by the truck when the vehicle is moved longitudinally beneath the latter, and a stop against which the truck strikes at the end of its rearward travel.

5. A stump-pulling device consisting of a wheeled frame, a truck or traveler movable longitudinally thereon and having means connecting it with the stump, and means whereby an upward pull from the traveler is applied to lift the stump when the main frame is moved longitudinally along the ground with relation to the traveler and stump.

In witness whereof I have hereunto set my hand.

EDMUND P. BODEN.

Witnesses:
E. CLOSE,
G. G. SMITH.